United States Patent
Senile et al.

(10) Patent No.: US 7,302,793 B2
(45) Date of Patent: Dec. 4, 2007

(54) METHODS AND APPARATUS TO REDUCE TURBINE ENGINE NOZZLE BASESHEET STRESSES

(75) Inventors: Darrell Glenn Senile, Oxford, OH (US); Christina Marie Burke, Hamilton, OH (US); Bernard J. Renggli, Cincinnati, OH (US); John Sigfrid Amneus, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 867 days.

(21) Appl. No.: 10/696,319

(22) Filed: Oct. 29, 2003

(65) Prior Publication Data

US 2005/0091983 A1 May 5, 2005

(51) Int. Cl.
*F02K 1/12* (2006.01)
(52) U.S. Cl. .................. 60/232; 60/771; 239/265.39; 239/265.41
(58) Field of Classification Search .................. 60/230, 60/232, 771; 239/265.39, 265.41
See application file for complete search history.

(56) References Cited

U.S. PATENT DOCUMENTS

| 4,292,802 | A | 10/1981 | Snow |
| 4,637,550 | A | 1/1987 | Nash |
| 4,690,330 | A * | 9/1987 | Robinson et al. ...... 239/265.39 |
| 5,000,386 | A | 3/1991 | Lybarger |
| 5,039,014 | A | 8/1991 | Lippmeier |
| 5,054,997 | A | 10/1991 | Corsmeier et al. |
| 5,076,496 | A * | 12/1991 | Lippmeier ............. 239/265.41 |
| 5,285,637 | A * | 2/1994 | Barcza .................. 239/265.35 |
| 5,307,624 | A | 5/1994 | Even-Nur et al. |
| 5,437,411 | A | 8/1995 | Renggli |
| 5,667,140 | A | 9/1997 | Johnson et al. |
| 5,683,034 | A | 11/1997 | Johnson et al. |
| 5,713,522 | A | 2/1998 | Lundberg |
| 5,797,544 | A | 8/1998 | Ward |
| 6,658,854 | B2 * | 12/2003 | Senile et al. .................. 60/771 |
| 7,013,650 | B2 * | 3/2006 | Mandet ....................... 60/771 |

* cited by examiner

*Primary Examiner*—Ted Kim
(74) *Attorney, Agent, or Firm*—William Scott Andes Armstrong Teasdale LLP

(57) ABSTRACT

A method facilitates assembling a flap system for a gas turbine engine exhaust nozzle including at least one backbone assembly. The method comprises providing a basesheet including a pair of circumferentially-spaced sides coupled together by an upstream side and a downstream side, forming at least one relief cut in the basesheet that extends at least partially across the basesheet from at least one of the circumferentially-spaced sides, and coupling the basesheet to the backbone assembly.

20 Claims, 3 Drawing Sheets

METHODS AND APPARATUS TO REDUCE TURBINE ENGINE NOZZLE BASESHEET STRESSES

GOVERNMENT RIGHTS STATEMENT

The U.S. Government has rights in this invention pursuant to Contract No. F336957-99-D-2050.

BACKGROUND OF THE INVENTION

This invention relates generally to gas turbine engine exhaust nozzles and more particularly, to methods and apparatus for reducing turbine engine exhaust nozzle basesheet stresses.

At least some known gas turbine engines include an exhaust nozzle including a variable geometry system. The variable geometry system adjusts an area of the exhaust nozzle through the use of flaps and seals. The flaps define discrete sectors of the flowpath, and the seals form the remaining flowpath between adjacent flaps. Because the exhaust nozzles are subjected to high temperatures and thermal gradients as a result of hot combustion gases exiting the engine, the variable geometry systems must maintain a coherent flowpath while shielding the structural components of the variable geometry system.

At least some known flap systems consist of a backbone and a basesheet. The backbone secures the basesheet within the variable geometry system. To facilitate extending a useful life at high temperature operation, at least some known basesheets are fabricated from non-metallic materials, such as ceramic matrix composite (CMC) materials.

At least some known basesheets are divergent and are attached to the backbone using mechanical fasteners, such as rivets or bolts. Over time, continued thermal expansion may create local stress concentrations within the divergent basesheets. Furthermore, continued thermal cycling may cause the divergent basesheet to deform or distort. Because such tensile strength may be a weakest load path through the basesheet, continued thermal cycling may cause premature failure of the basesheet.

BRIEF SUMMARY OF THE INVENTION

In one aspect, a method for assembling a flap system for a gas turbine engine exhaust nozzle including at least one backbone assembly is provided. The method comprises providing a basesheet including a pair of circumferentially-spaced sides coupled together by an upstream side and a downstream side, forming at least one relief cut in the basesheet that extends at least partially across the basesheet from at least one of the circumferentially-spaced sides, and coupling the basesheet to the backbone assembly.

In another aspect, an assembly for a gas turbine engine exhaust nozzle is provided. The assembly includes a backbone and a basesheet that is configured to couple to the backbone. The basesheet includes at least one relief cut and a pair of circumferentially-spaced sides coupled together by an upstream side and a downstream side. The at least one relief cut extends from at least one of the circumferentially-spaced sides towards the other respective circumferentially-spaced side.

In a further aspect, a gas turbine engine including a variable engine exhaust nozzle that includes a flap system coupled to the engine exhaust nozzle is provided. The flap system includes a backbone and a basesheet that is configured to couple to the backbone. The basesheet includes at least one relief cut and a pair of circumferentially-spaced sides coupled together by an upstream side and a downstream side. The at least one relief cut extends from at least one of the circumferentially-spaced sides towards the other respective circumferentially-spaced side.

DETAILED DESCRIPTION OF THE INVENTION

Figure 1:
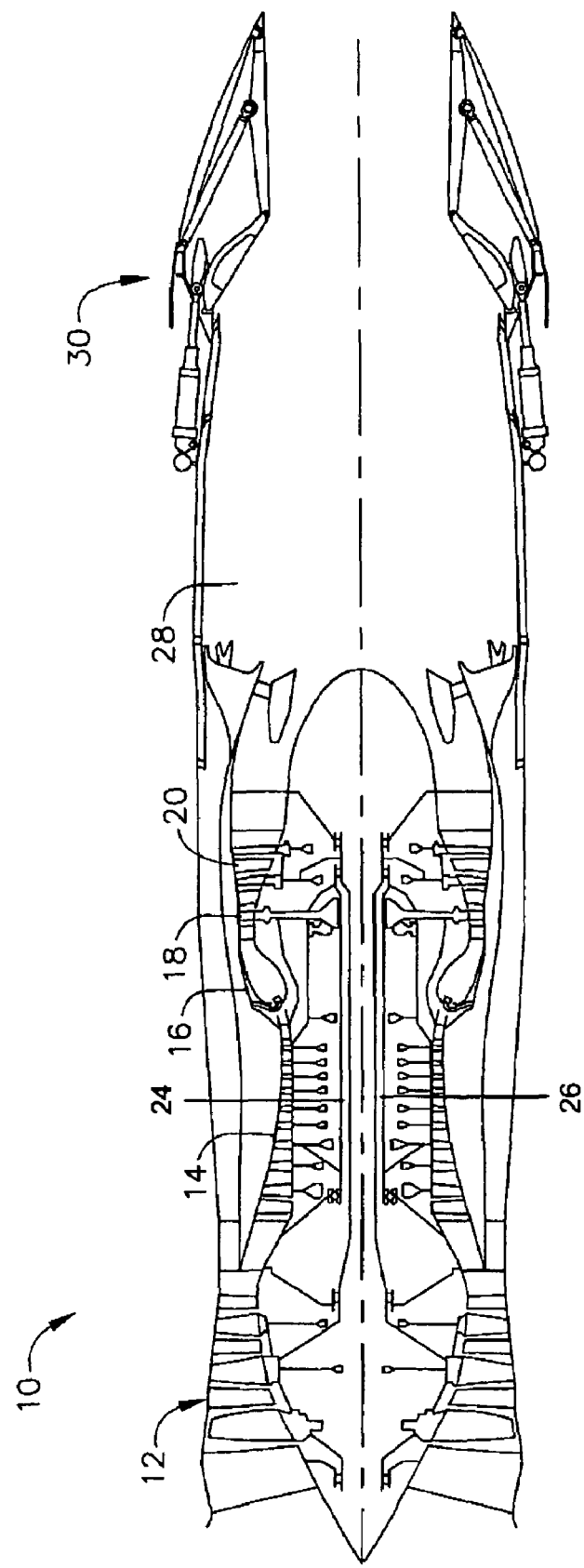
FIG. 1 is a schematic illustration of a gas turbine engine.

FIG. 1 is a schematic illustration of a gas turbine engine 10 including a fan assembly 12, a high pressure compressor 14, and a combustor 16. In one embodiment, engine 10 is a F414 engine available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system 28. Exhaust system 28 includes a variable geometry system 30.

Figure 2:
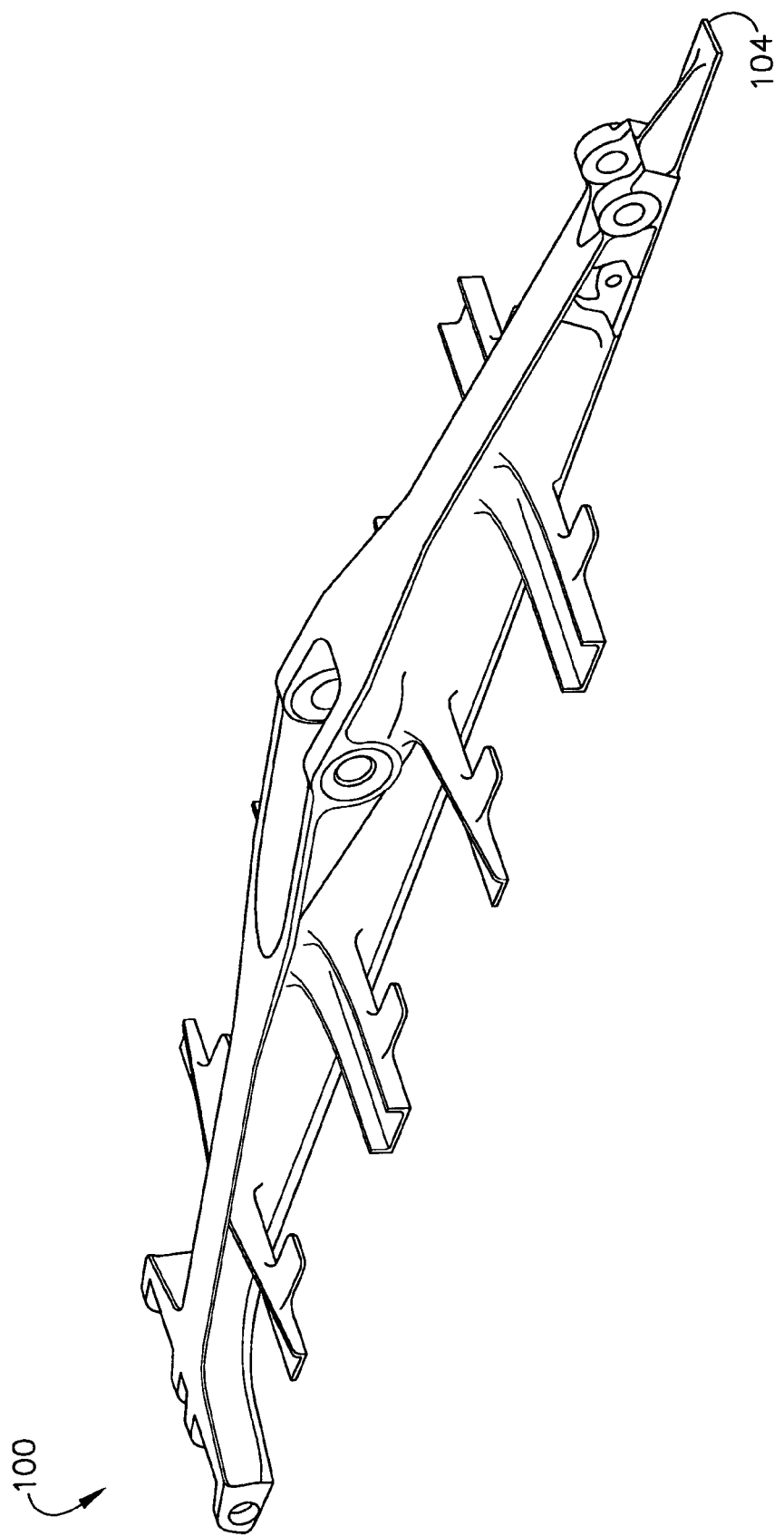
FIG. 2 is a perspective view of a portion of a flap system that may be used with the engine shown in FIG. 1.
Figure 3:
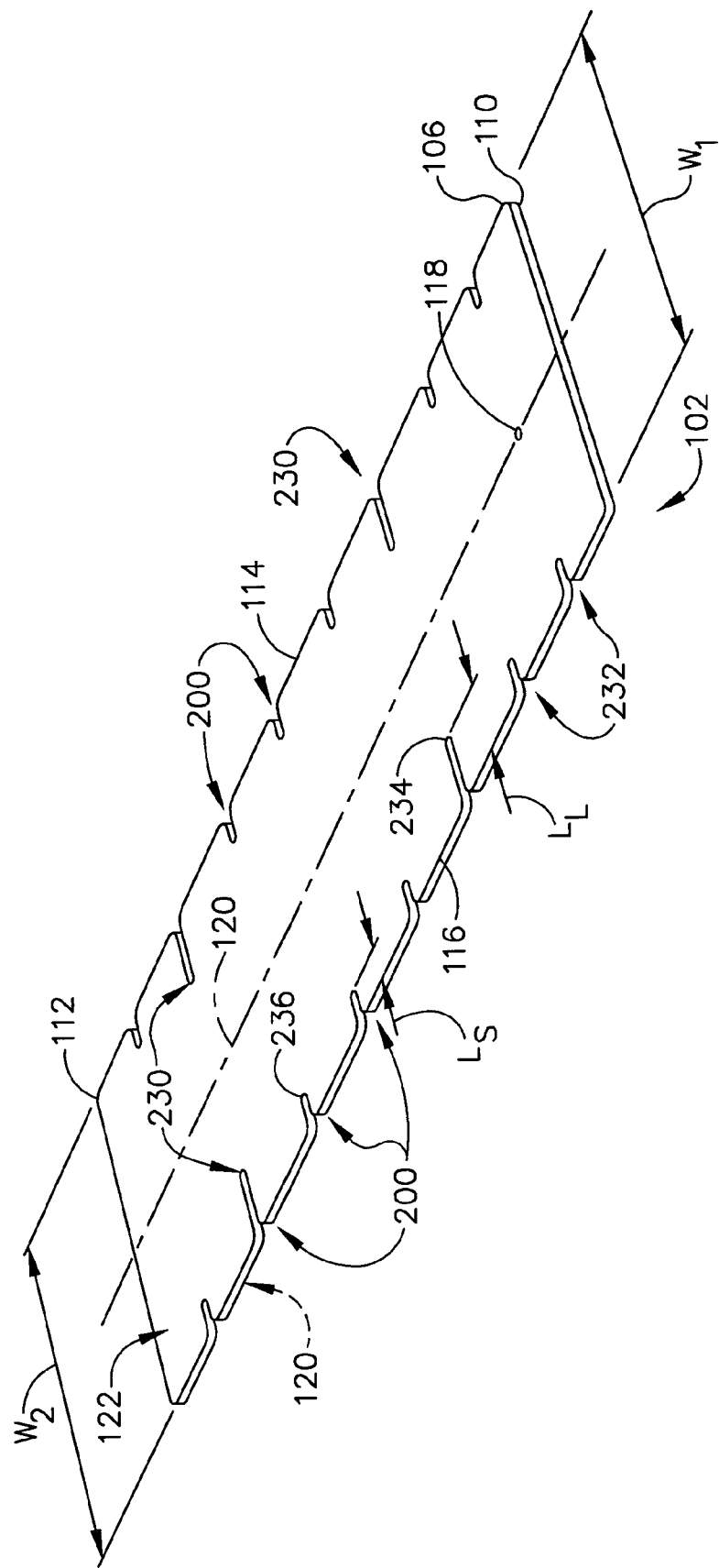
FIG. 3 is a perspective view of an exemplary basesheet that may be used with the gas turbine engine shown in FIG. 1.

FIG. 2 is a perspective view of an exemplary flap system 100 that may be used with engine 10 (shown in FIG. 1). FIG. 3 is a perspective view of an exemplary basesheet assembly 106 that may be used with gas turbine engine 10. Flap system 100 is coupled to an exhaust nozzle, such as exhaust system 28 (shown in FIG. 1) to facilitate shielding variable geometry system components from high temperature combustion gases exiting the engine. More specifically, flap system 100 is coupled to the exhaust nozzle such that a flowpath side 102 of flap system 100 is exposed to combustion gases exiting engine. Accordingly, flap system flowpath side 102 defines a portion of the flowpath through the nozzle.

Flap system 100 includes a plurality of backbones 104 and basesheet assemblies 106 extending circumferentially within the engine exhaust nozzle. More specifically, backbone 104 is exemplary and is known in the art. Basesheet assembly 106 is coupled within the engine exhaust nozzle by backbone 104, and includes has a leading edge 110 and a trailing edge 112. Basesheet assembly leading and trailing edges 110 and 112, respectively, are coupled together by a pair of side edges 114 and 116. Basesheet assembly 106 also includes an opening 118 extending through basesheet assembly 106 between opposite sides 120 and 122 of basesheet assembly 106. Opening 118 is sized to receive a fastener (not shown) therethrough for securely coupling basesheet assembly 106 to backbone 104. In the exemplary embodiment, basesheet side 120 is a flowpath side of basesheet assembly 106 and side 122 is a radially outer side of basesheet assembly 106.

Leading edge 110 and trailing edge 112 each have a respective width $W_1$ and $W_2$ measured between side edges 114 and 116. In the exemplary embodiment, basesheet assembly 106 is divergent such that trailing edge width $W_2$ is wider than leading edge width $W_1$. A centerline axis 120 extends through basesheet assembly 106 between leading and trailing edges 110 and 112, respectively. In the exemplary embodiment, leading and trailing edges 110 and 112, respectively, are substantially perpendicular to centerline axis 120. In an alternative embodiment, leading and trailing edges 110 and 112 are non-parallel.

In the exemplary embodiment, basesheet assembly 106 includes a plurality of relief cuts 200 which extend through basesheet assembly 106 between basesheet sides 120 and 122. In an alternative embodiment, basesheet assembly 106 only includes one relief cut 200. Each relief cut 200 extends circumferentially inward from a respective side edge 114 and 116 towards basesheet centerline axis 120. In an alternative embodiment, relief cuts 200 extend only from one of side edges 114 or 116. More specifically, in the exemplary embodiment, each relief cut 200 is oriented substantially perpendicularly to centerline axis 120. In another embodiment, each relief cut 200 is oriented obliquely with respect to centerline axis 120.

In the exemplary embodiment, basesheet assembly relief cuts 200 include long relief cuts 230 and short relief cuts 232. Each relief cut 230 and 232 has a length $L_L$ and $L_S$ measured from a respective basesheet assembly side 114 or 116 to an end 234 and 236 of respective relief cuts 230 and 232. In the exemplary embodiment, relief cuts 230 and 232 extending inwardly from each side 114 and 116 are axially aligned with respect to each other across basesheet assembly 106, such that sides 114 and 116 are mirror images of each other. It should be noted that the size, length, width, number, orientation, and location of relief cuts 200 are variably selected, as described in more detail below, to facilitate each relief cut 200 reducing thermal stresses, deformation, and distortion of basesheet assembly 106.

During assembly of flap system 100, initially relief cuts 200 are formed within basesheet assembly 106. More specifically, the number, size, length, width, number, orientation, and location of relief cuts 200 with respect to basesheet assembly 106 is variably selected to facilitate relief cuts reducing thermal stresses induced to basesheet assembly 106. More specifically, as basesheet assembly 106 is thermally cycled during engine operation, relief cuts 200 facilitate reducing thermal stresses induced to basesheet assembly 106 such that deformation, thermal yield, and/or distortion of basesheet assembly 106 is also reduced. More specifically, relief cuts 200 permit basesheet assembly 106 to thermally expand relative to backbone 104 while facilitating reducing thermal stresses induced to basesheet assembly 106 and backbone 104.

In the exemplary embodiments described herein, a divergent flap basesheet has been illustrated. However, the stress relief techniques described herein can be applied to a similarly constructed convergent flap basesheet.

The above-described flap system is cost-effective and highly reliable. The flap system includes a basesheet assembly that is coupled to the backbone. The basesheet assembly includes a plurality of relief cuts that facilitate reducing thermal stresses induced to the basesheet assembly. Accordingly, deformation and/or distortion of the basesheet assembly is facilitated to be reduced in a cost-effective and reliable manner.

While the invention has been described in terms of various specific embodiments, those skilled in the art will recognize that the invention can be practiced with modification within the spirit and scope of the claims.

What is claimed is:

1. A method for assembling a flap system for a gas turbine engine exhaust nozzle including at least one backbone assembly, said method comprising:
   providing a basesheet including a pair of circumferentially-spaced sides coupled together by an upstream side and a downstream side;
   forming a first plurality of relief cuts and a second plurality of relief cuts in the basesheet that extend at least partially across the basesheet from at least one of the circumferentially-spaced sides, wherein the first plurality of relief cuts have a length greater than that of the second plurality of relief cuts; and
   coupling the basesheet to the backbone assembly.

2. A method in accordance with claim 1 wherein the basesheet includes a flowside and an opposite back side, said forming a first plurality of relief cuts and a second plurality of relief cuts in the basesheet further comprises extending each relief cut through the basesheet from the basesheet flowside to the basesheet back side.

3. A method in accordance with claim 1 wherein forming a first plurality of relief cuts and a second plurality of relief cuts in the basesheet further comprises forming a first plurality of relief cuts and a second plurality of relief cuts that extend at least partially across the basesheet from each of the circumferentially-spaced sides.

4. A method in accordance with claim 1 wherein forming a first plurality of relief cuts and a second plurality of relief cuts in the basesheet further comprises forming the first plurality of relief cuts and the second plurality of relief cuts in the basesheet to facilitate reducing thermal stresses induced to said basesheet.

5. A method in accordance with claim 1 wherein forming a first plurality of relief cuts and a second plurality of relief cuts in the basesheet further comprises forming the first plurality of relief cuts and the second plurality of relief cuts in the basesheet to facilitate reducing deformation of said basesheet.

6. An assembly for a gas turbine engine exhaust nozzle, said assembly comprising
   a backbone; and
   a basesheet configured to coupled to said backbone, said basesheet comprising a first plurality of relief cuts and a second plurality of relief cuts and a pair of circumferentially-spaced sides coupled together by an upstream side and a downstream side, said first plurality of relief cuts and second plurality of relief cuts extending from at least one of said circumferentially-spaced sides towards said other respective circumferentially-spaced side, said first plurality of relief cuts having a length greater than that of said second plurality of relief cuts.

7. An assembly in accordance with claim 6 wherein said basesheet further comprises a flowpath side and an opposite back side, said first plurality of relief cuts and second plurality of relief cuts extending from said flowpath side to said back side.

8. An assembly in accordance with claim 6 wherein said basesheet has a centerline axis, said first plurality of relief cuts and second plurality of relief cuts oriented substantially perpendicularly to said centerline axis.

9. An assembly in accordance with claim 6 wherein said first plurality of relief cuts and second plurality of relief cuts comprise at least one relief cut extending at least partially across said basesheet from each said circumferentially-spaced basesheet side.

10. An assembly in accordance with claim 6 wherein said first plurality of relief cuts and second plurality of relief cuts are spaced axially between said basesheet upstream and downstream sides.

11. An assembly in accordance with claim 6 wherein said first plurality of relief cuts and second plurality of relief cuts facilitate reducing thermal stresses induced to said basesheet.

12. An assembly in accordance with claim 6 wherein said basesheet first plurality of relief cuts and second plurality of relief cuts facilitate reducing deformation of said basesheet.

13. An assembly in accordance with claim 6 wherein said basesheet upstream side has a first width measured between said circumferentially-spaced sides, said basesheet downstream side has a second width measured between said circumferentially-spaced sides, said first width different than said second width.

14. A gas turbine engine in accordance with claim 6 wherein said first plurality of relief cuts and second plurality of relief cuts facilitate reducing thermal stresses induced to said basesheet during engine operation.

15. A gas turbine engine comprising a variable engine exhaust nozzle comprising a flap system coupled to said engine exhaust nozzle, said flap system comprising a backbone and a basesheet configured to coupled to said backbone, said basesheet comprising a first plurality of relief cuts and second plurality of relief cuts and a pair of circumferentially-spaced sides coupled together by an upstream side and a downstream side, said first plurality of relief cuts and second plurality of relief cuts extending from at least one of said circumferentially-spaced sides towards said other respective circumferentially-spaced side, said first plurality of relief cuts having a length greater than that of said second plurality of relief cuts.

16. A gas turbine engine in accordance with claim 15 wherein said flap system basesheet comprises a flowpath side and an opposite back side, said first plurality of relief cuts and second plurality of relief cuts extending from said flowpath side to said back side.

17. A gas turbine engine in accordance with claim 16 wherein said basesheet has a centerline axis, said first plurality of relief cuts and second plurality of relief cuts are oriented substantially perpendicularly to said centerline axis.

18. A gas turbine engine in accordance with claim 16 wherein said first plurality of relief cuts and second plurality of relief cuts comprise at least one relief cut extending at least partially across said basesheet from each said circumferentially-spaced basesheet side.

19. A gas turbine engine in accordance with claim 16 wherein said first plurality of relief cuts and second plurality of relief cuts comprise a plurality of axially-spaced relief cuts extending between said basesheet upstream and downstream sides.

20. A gas turbine engine in accordance with claim 16 wherein said first plurality of relief cuts and second plurality of relief cuts facilitate reducing deformation of said basesheet during engine operation.

\* \* \* \* \*